(12) United States Patent
Kirazci et al.

(10) Patent No.: US 9,355,113 B2
(45) Date of Patent: May 31, 2016

(54) ENCODING AND DECODING DELTA VALUES

(71) Applicant: Google Inc., Mountain View, CA (US)

(72) Inventors: Ulas Kirazci, Mountain View, CA (US); Justin Foutts, San Mateo, CA (US)

(73) Assignee: Google Inc., Mountain View, CA (US)

( * ) Notice: Subject to any disclaimer, the term of this patent is extended or adjusted under 35 U.S.C. 154(b) by 209 days.

(21) Appl. No.: 14/013,502

(22) Filed: Aug. 29, 2013

(65) Prior Publication Data

US 2014/0201174 A1 Jul. 17, 2014

Related U.S. Application Data

(60) Provisional application No. 61/753,551, filed on Jan. 17, 2013.

(51) Int. Cl.
*G06F 17/30* (2006.01)

(52) U.S. Cl.
CPC ................. *G06F 17/30153* (2013.01)

(58) Field of Classification Search
CPC ..................... H03M 1/00; G07B 17/00362
USPC .................................. 707/822, 693
See application file for complete search history.

(56) References Cited

U.S. PATENT DOCUMENTS

| | | | |
|---|---|---|---|
| 5,450,130 A * | 9/1995 | Foley | 348/391.1 |
| 7,424,467 B2 | 9/2008 | Fontoura et al. | |
| 7,743,060 B2 | 6/2010 | Fontoura et al. | |
| 7,756,863 B2 | 7/2010 | Altevogt et al. | |
| 7,965,426 B2 * | 6/2011 | Hori et al. | 358/518 |
| 8,218,624 B2 * | 7/2012 | Holcomb et al. | 375/240.03 |
| 8,234,270 B2 | 7/2012 | Altevogt et al. | |
| 8,362,952 B2 * | 1/2013 | Brenner | 342/357.77 |
| 2004/0119841 A1 * | 6/2004 | Shimizu | 348/222.1 |
| 2006/0010002 A1 * | 1/2006 | Kunde | G07B 17/00362 711/173 |
| 2006/0103889 A1 * | 5/2006 | Adachi | H04N 1/41 358/426.04 |
| 2009/0129466 A1 * | 5/2009 | Cho et al. | 375/240.03 |
| 2010/0054542 A1 * | 3/2010 | Archibald et al. | 382/107 |
| 2012/0271813 A1 | 10/2012 | Shen et al. | |
| 2013/0176431 A1 * | 7/2013 | Ogawa et al. | 348/143 |

OTHER PUBLICATIONS

Stepanov, Aleaxander A. et al. "SIMD-Based Decoding of Posting Lists", Proceeding of the 20th ACEM International Conference on Information and Knlowdge Management, 2011, 9 pages.*
Stepanov, Alexander A. et al., "SIMD-Based Decoding of Posting Lists", Proceedings of the 20th ACEM International Conference on Information and Knowledge Management, 2011, 9 pages.

* cited by examiner

*Primary Examiner* — Baoquoc N To
(74) *Attorney, Agent, or Firm* — Fish & Richardson P.C.

(57) ABSTRACT

Methods, systems, and apparatus, including computer programs encoded on a computer storage medium, for encoding and decoding delta values. In one aspect, a method includes accessing a compression buffer having a start position, a sentinel position, and a data storage region; obtaining a first value; determining that a second value stored in the sentinel position does not match a first sentinel value; determining that a third value stored in the start position matches a second sentinel value; and storing the first value at the start position of the compression buffer.

13 Claims, 5 Drawing Sheets

ENCODING AND DECODING DELTA VALUES

CROSS-REFERENCE TO RELATED APPLICATION

This application claims the benefit of U.S. Provisional Application Ser. No. 61/753,551 filed on Jan. 17, 2013, which is incorporated by reference.

TECHNICAL FIELD

This specification generally relates to data compression, and more particularly to encoding and decoding delta values.

BACKGROUND

Data compression methods and devices involve encoding information in a manner that uses less storage space than the original representation. Common data compression techniques involve compression of data that occupies a relatively large amount of space, such as video files, audio files, and image files. Data compression techniques are particularly useful in computing devices where storage space for data is limited. Data compression techniques are also useful for data transmission, as transmission of smaller, compressed files is generally more efficient than transmission of larger, uncompressed files. One tradeoff of using data compression is computational cost for encoding, or compressing, the data and a similar computational cost for decoding, or decompressing the data.

SUMMARY

This specification describes technologies relating to encoding and decoding delta values.

Data can be encoded and decoding using data differencing techniques that encode differences between values rather than storing the full values. Delta encoding techniques may be used, for example, to compress an index file stored in a data storage device of a data processing apparatus, such as a mobile phone, tablet computer, or server computer.

Indexes, such as those for documents and other resources, are used to store data to facilitate fast and accurate information retrieval. For example, an index may include a mapping of index terms to documents that include the terms. Each term is associated with a set of documents that contain the word, e.g., in a posting list, and each document in a posting list may be represented by a document number. When a computing device searches the index, terms included in a search query are matched with terms in the index, and document numbers associated with the matched terms are retrieved. Documents may be obtained using the document numbers, and search results specifying the documents may be presented to the computing device.

The document numbers of an index are one example of data that can be delta encoded to conserve storage space for the index. For example, document numbers stored in a posting list may be delta encoded in a compression buffer, e.g., a disk-backed array, for each term of the index. A data processing apparatus may obtain each document number for a term and store the differences between document numbers in the compression buffer. The compression buffer may also expand when extra space is required. When decoding the document numbers, the most recently added document numbers will be decoded first.

By way of example, a disk-backed array may be initialized with a size n. The first few bytes of the array contain two special values. The first is a start pointer that is initialized to point to the end of the empty array. The second value is a sentinel value initialized to some invalid value. As document numbers are obtained, they are added to the array from the end first, working their way towards the two special values stored in the front of the array. Whenever a number is added, the previously added number is delta-encoded, until the stored values reach the portion of the array reserved for the sentinel value. At that point, the last two numbers are stored, uncompressed, in the sentinel position and start position, respectively, which fills the array. When another document number is to be added, new space is allocated for the disk-backed array, the start pointer and sentinel values are reset, and the process continues as described above. The foregoing operations are an example, and further details about the encoding and decoding of delta values are discussed below.

In general, one innovative aspect of the subject matter described in this specification can be embodied in methods that include the actions of accessing a compression buffer having a start position, a sentinel position, and a data storage region; obtaining a first value; determining that a second value stored in the sentinel position does not match a first sentinel value; determining that a third value stored in the start position matches a second sentinel value; and storing the first value at the start position of the compression buffer. Other embodiments of this aspect include corresponding systems, apparatus, and computer programs, configured to perform the actions of the methods, encoded on computer storage devices.

In general, another aspect of the subject matter described in this specification can be embodied in methods that include the actions of accessing a first compression buffer having a start position, a sentinel position, and a data storage region; obtaining a first value; determining that a second value stored in the sentinel position does not match a first sentinel value; determining that a third value stored in the start position does not match a second sentinel value; allocating a second compression buffer, the second compression buffer including each of a plurality of values stored in the first compression buffer; and storing the first value in the second compression buffer. Other embodiments of this aspect include corresponding systems, apparatus, and computer programs, configured to perform the actions of the methods, encoded on computer storage devices.

These and other embodiments can each optionally include one or more of the following features. Allocating a second compression buffer may comprise: selecting a second size for the second compression buffer that is greater than a first size of the first compression buffer; allocating the second compression buffer having a size equal to the second size, the second compression buffer having a second start position, a second sentinel position, and a second data storage region; copying values stored in the data storage region of the first compression buffer into the second data storage region of the second compression buffer; storing, in the second start position, an address that specifies a copied value that is adjacent to available space of the second data storage region; storing, in the second sentinel position, a sentinel value; inserting the second value stored in the sentinel position of the first compression buffer into the second data storage region of the second compression buffer; and inserting the third value stored in the start position of the first compression buffer into the second data storage region of the second compression buffer. In addition, an order of the values in the first compression buffer may be maintained when the values are copied into the second compression buffer.

Another aspect of the subject matter described in this specification can be embodied, generally, in methods that include the actions of accessing a compression buffer having a start position, a sentinel position, and a data storage region; obtaining a first value; determining that a second value stored in the sentinel position matches a sentinel value; accessing a first offset position of the compression buffer, the first offset position being specified by an address that is stored in the start position of the compression buffer; determining that the first offset position is at an end of the data storage region of the compression buffer; selecting a second offset position of the compression buffer by subtracting a size of the first value from the first offset position; storing, in the start position, an address specifying the second offset position of the compression buffer; and storing the first value at the second offset position of the compression buffer.

Another aspect of the subject matter described in this specification can be embodied, generally, in methods that include the actions of accessing a compression buffer having a start position, a sentinel position, and a data storage region; obtaining a first value; determining that a second value stored in the sentinel position matches a sentinel value; accessing a first offset position of the compression buffer, the first offset position being specified by an address that is stored in the start position of the compression buffer; determining that the first offset position is not at the end of the data storage region of the compression buffer; generating a compressed value, the compressed value being a difference between a third value stored at the first offset position and the first value; storing the compressed value at the first offset position; selecting a second offset position of the compression buffer by subtracting a size of the first value from the first offset position; determining that the second value is stored in the second offset position; inserting padding between the end of the sentinel position and the first offset position; and storing the first value in the sentinel position. This aspect may optionally include storing, in the start position, a second sentinel value.

Another aspect of the subject matter described in this specification can be embodied, generally, in methods that include the actions of accessing a compression buffer having a start position, a sentinel position, and a data storage region; obtaining a first value; determining that a second value stored in the sentinel position matches a sentinel value; accessing a first offset position of the compression buffer, the first offset position being specified by an address that is stored in the start position of the compression buffer; determining that the first offset position is not at the end of the data storage region of the compression buffer; generating a compressed value, the compressed value being a difference between a third value stored at the first offset position and the first value; storing the compressed value at the first offset position; selecting a second offset position of the compression buffer by subtracting a size of the first value from the first offset position; determining that the second value is not at the second offset position; storing, in the start position, a second address specifying the second offset position of the compression buffer; and storing the first value at the second offset position of the compression buffer.

Particular embodiments of the subject matter described in this specification can be implemented so as to realize one or more of the following advantages. Changes to a disk-backed compression buffer are reflected automatically without further serialization/deserialization logic. A compression buffer may be configured to encode values in chronological order, such that the most recently added values are decoded first. In situations where data freshness is relevant to information retrieval, this facilitates fast retrieval of the most recent values. Delta encoded compression reduces storage space, which facilitates efficient management of data storage in devices with limited storage capacity. In addition, values may be encoded in amortized constant time, facilitating efficient management of computational costs associated with data compression.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
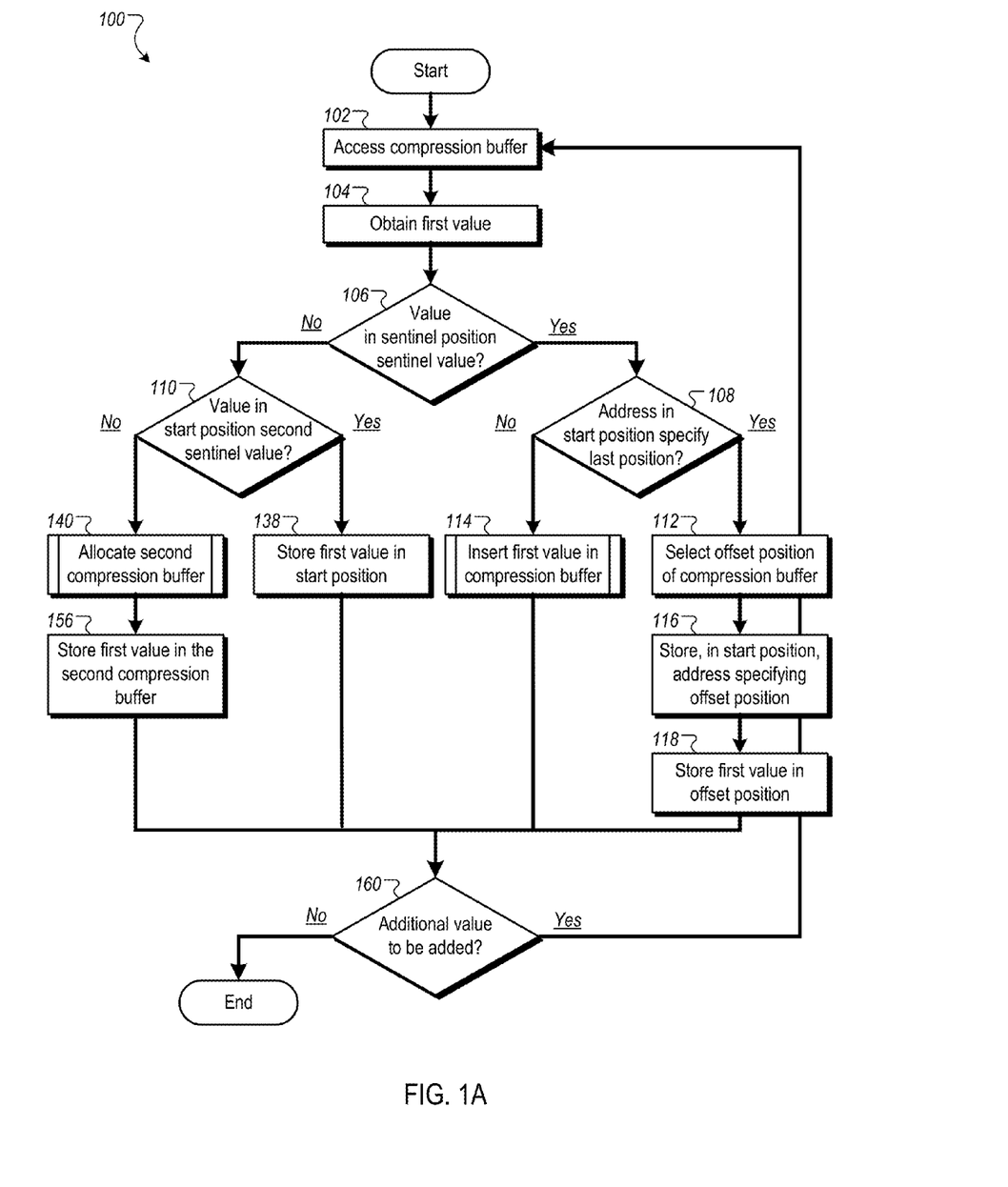
FIG. 1A is an example process flow in which data is delta encoded.

FIG. 1A is an example process flow 100 in which data is delta encoded. The process 100 may be implemented by a data processing apparatus, such as a tablet computer or mobile telephone.

The process 100 accesses a compression buffer having a start position, a sentinel position, and a data storage region (102). In some implementations, the buffer is initialized with an address in the start position and a sentinel value in the sentinel position. For example, the address in the start position may be a pointer to the end of the data storage region of the compression buffer. The sentinel value may be, for example, an invalid value such as ~0—e.g., 0xffffffff for an unsigned 32-bit integer—that indicates a certain property of the compression buffer.

The process 100 obtains a value (104). The obtained value is a value to be delta encoded in the compression buffer. For example, if a list of integers representing document identifiers is to be delta-encoded, the obtained value may be an uncompressed integer value. Values of any value type that is capable of being delta encoded may be obtained, and the process need not be limited to delta encoding integer values.

The process 100 determines whether the value stored in the sentinel position of the compression buffer is the sentinel value (106). In some implementations, the sentinel position of the compression buffer is the second to last position to be filled with a value. In such an implementation, determining that the sentinel position includes the sentinel value indicates that the compression buffer is not full and that the start position includes an address of the data storage region of the compression buffer. In this situation, the process proceeds to step 108, which is described in further detail below. If, on the other hand, the process determines that the sentinel position does not include the sentinel value, this indicates that the compression buffer is almost full, and the process proceeds to step 110, which is described in further detail below.

In response to determining (in step 106) that the value stored in the sentinel position is the sentinel value, the process 100 determines whether the address specified by the start position is the last position of the compression buffer (108). In other words, the process determines if the data storage region of the compression buffer is empty. For example, the process may access an offset position of the compression buffer specified by the address in the start position and determine that the offset position is the last position by examining the data stored at the address to determine if it represents a stored value. In some implementations, the address of the last position of the compression buffer may have been recorded when the buffer was initialized, and a comparison of the recorded address can be compared to the address specified by the start position. In response to determining that the address specified by the start position is the last position of the compression buffer, the process proceeds to step 112, which is described in further detail below. If, on the other hand, the process determines that the address specified by the start position is not the last position of the compression buffer, the process proceeds to step 114, which will be described in further detail below.

Storing the first value in an empty compression buffer.

In response to determining (in step 108) that the address specified by the start position is the last position of the compression buffer, the process 100 selects an offset position of the compression buffer (112). The offset position specifies an address at which the value obtained in step 104 will be inserted. In some implementations, the offset position is selected by subtracting the size of the obtained value from the last position of the compression array. In other words, the offset position is calculated based on the amount of space required to store the obtained value at the end of the compression buffer.

The process 100 stores, in the start position, an address of the offset position (116). Instead of pointing to the end of the compression buffer, the start position now specifies the address of the offset position—e.g., the position where the obtained value is to be stored.

The process 100 stores the obtained value in the offset position (118). In some implementations, the obtained value is stored in uncompressed form. For example, if the obtained value is a 32-bit integer, it may be stored in the compression buffer as a 32-bit integer because there is no existing value to which it can be compared. After storing the obtained value, the process proceeds to step 160, which will be described in further detail below.

Storing values in a compression buffer that is not empty, and in which the sentinel position contains the sentinel value.

Figure 1B:
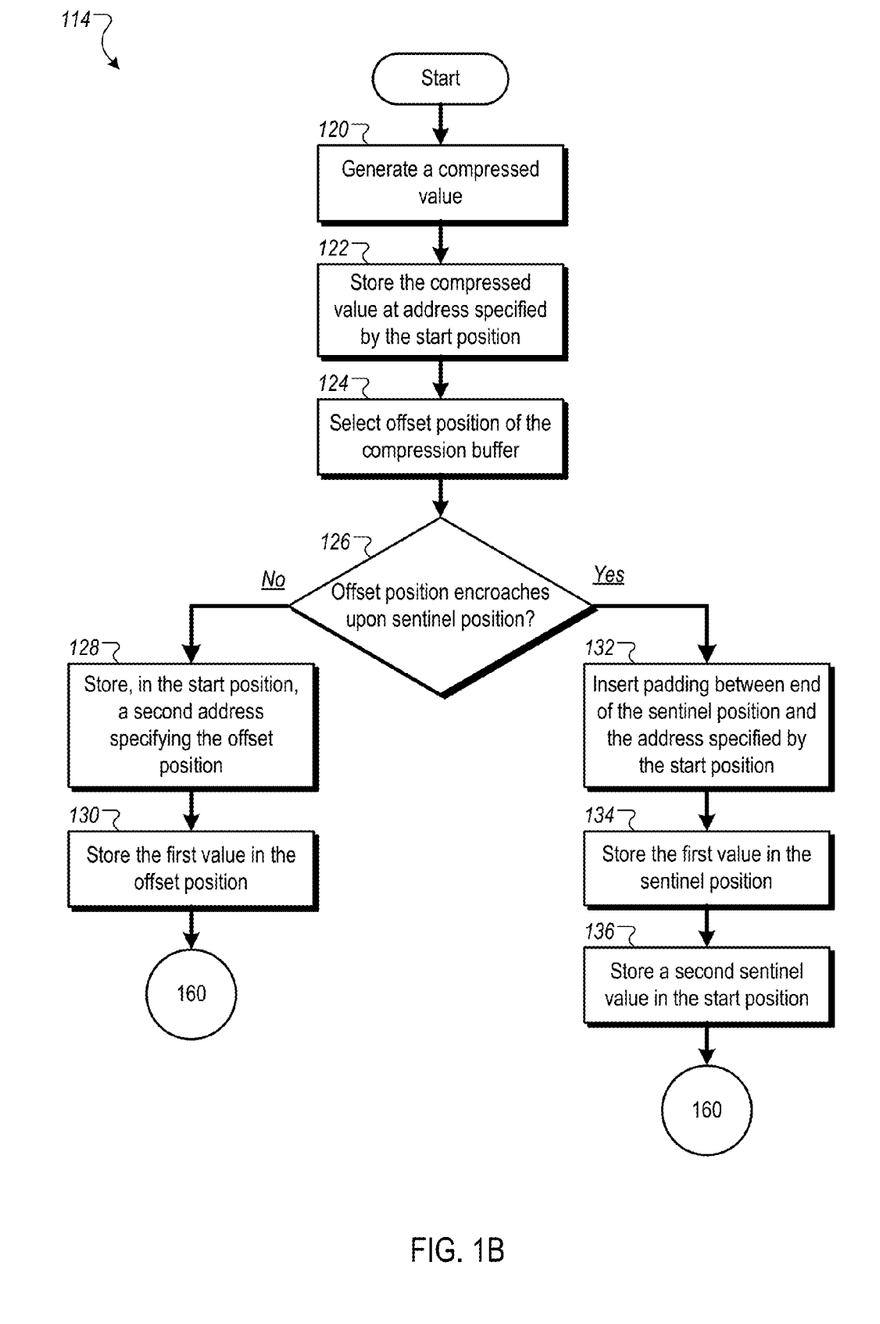
FIG. 1B is an example process flow in which a value is inserted in a compression buffer.

FIG. 1B is an example process flow 114 in an obtained value is inserted in a compression buffer. The process 114 may be implemented by a data processing apparatus, such as the data processing apparatus used to perform process 100.

In response to determining (in step 108) that the address specified by the start position is not the last position of the compression buffer, the process 114 generates a compressed value (120). The compressed value is a difference between the value stored at the address specified by the start position and the value obtained in step 104. For example, if the value obtained in step 104 is 28, and the value stored at the address specified by the start position is 32, the compressed value is 4. The compressed value may be encoded in any suitable format for compression, such as varint, group varint, UTF-8 or UTF-16, and may depend on the type and size of the data. For example, if values to be compressed are unsigned 32-bit integers, the difference between a given pair of unsigned 32-bit integer values may be small enough that a compressed value, e.g., a signed integer, may be represented by 8 or 16 bits.

The process 114 stores the compressed value at the address specified by the start position (122). In some implementations, the compressed value requires less storage space than the previously stored uncompressed value, and the compressed value may be stored at an offset position that is selected or updated to reflect the difference in size. For example, if the uncompressed value occupied 32 bits, but the compressed value only requires 16 bits, the address of the start position may be offset by 16 bits to specify an address that accounts for the difference in space required to store the compressed value.

The process 114 selects a new offset position of the compression buffer (124). The new offset position is calculated based on the size of the value to be inserted—e.g., the value obtained in step 104.

The process 114 determines whether the new offset position encroaches on the sentinel position (126). For example, the process determines whether the address specified by the new offset position includes the sentinel value, e.g., 0xffffffff. If the process determines that the new offset position does not encroach on the sentinel, the process stores, in the start position, the address of the new offset position (128) and inserts the obtained value in the new offset position (130) before proceeding to step 160. If, on the other hand, the process determines that the new offset position does encroach on the sentinel position, e.g., the compression buffer is nearly full, the process proceeds to step 132.

In response to determining (in step 126) that the new offset position encroaches on the sentinel position, the process 114 inserts padding between the end of the sentinel position and the address specified by the start position (132). In some implementations, inserting padding includes inserting values to arbitrarily lengthen the value to be inserted in a way that indicates when the address specified by the start position has been reached. For example, if the value to be inserted is the integer, 5, using varint encoding, the integer 5 may be represented (in hex) by 0x05. The padding may be in the form of a hex no operation, e.g., 0x05, after padding, may be 0x85 0x80 0x80 0x00. In the foregoing example, the 0x00 represents the end of the padding.

The process 114 stores the obtained value in the sentinel position (134). For example, the obtained value may be stored in place of the sentinel value in uncompressed form. Overwriting the sentinel value with an actual value is one way in which the process 100 may determine that the compression buffer is nearly full—e.g., in step 106.

The process 114 stores a second sentinel value in the start position (136). In some implementations, the second sentinel value is the same as the sentinel value originally stored in the sentinel position, e.g., ~0, or 0xffffffff. The second sentinel's presence in the start position indicates, for example, that the data storage region of the compression buffer and the sentinel position of the compression buffer are full, and that the last remaining space for a value is in the start position. After inserting the second sentinel value in the start position, the process proceeds to step 160.

Storing values in a compression buffer that is full or almost full.

In response to determining (in step 106) that the value stored in the sentinel position is not the sentinel value, the process 100 determines whether the value stored in the start position of the compression buffer is a second sentinel value (110). If the process determines that the value stored in the start position is the second sentinel value, the process stores the obtained value in the start position of the compression buffer (138) and proceeds to step 160. The presence of the second sentinel value in the start position indicates, for example, that the compression buffer is nearly full—except for the start position.

In response to determining (in step 110) that the value stored in the start position is not the sentinel value, the process 100 allocates a second compression buffer (140). The second compression buffer includes each value that was stored in the original compression buffer. Allocation of the second compression buffer is described in more detail below with reference to FIG. 1C. After allocating the second compression buffer, the process stores the obtained value in the second compression buffer (156). In some implementations, the process stores the obtained value at an address specified by a second start position of the second compression buffer. The process used to store the first value in the second compression buffer may be similar to process 114 described above. After storing the obtained value in the second compression buffer, the process proceeds to step 160.

The process 100 determines whether additional values are to be added to the compression buffer (160). In some situations, more values exist that are to be added to the compression buffer, and the process returns to step 102. In other situations, no more values are to be added to the compression buffer, and the process ends. In some implementations, step 160 is optional—e.g., the process 100 may only be run once, on demand, for a particular value.

In some implementations, the process 100 may allocate a second compression buffer after the obtained value is stored in the start position of the compression buffer—e.g., after step 138. Once a value has been placed in the start position of the compression buffer, the entire compression buffer contains obtained values. In particular, the compression buffer has an uncompressed value in the start position, another uncompressed value in the sentinel position, some padding (if necessary), and compressed values in the data storage region of the compression buffer. At this point, a second compression buffer may be initialized—the process need not wait for an additional value to be obtained first.

The process described with reference to FIGS. 1A and 1B is an example process for encoding delta values. The order in which the steps are described with reference to FIGS. 1A and 1B need not be the only order in which delta values are encoded and stored in a compression buffer. Various steps may be performed in a different order or in a different manner. For example, in step 136, the process stores a second sentinel value in the start position; this step may be performed before or in parallel with steps 132 and 134. In another example process, when a value is stored in the start position (e.g., at step 138), the process may generate a compressed value for the value stored in the sentinel position.

Retrieving values from the compression buffer may depend on the current state of the compression buffer. For example, if the sentinel value is in the sentinel position, the compression buffer is not full, and the most recently added value is stored at the address specified by the start value. Retrieved values may be added to the next encoded value of the compression buffer to decode the next value. If, the sentinel value is not in the sentinel position, compression buffer is either full or has only the start position available. Thus, if the start position includes a sentinel value, the value in the sentinel position is the first value of the compression buffer. If the start position does not include the sentinel value, the start position is the start of the array. In the implementation described above, the values are decoded and retrieved from the compression buffer in the opposite order in which they were added—with the most recent values being retrieved first.

Allocating a second compression buffer.

Figure 1C:
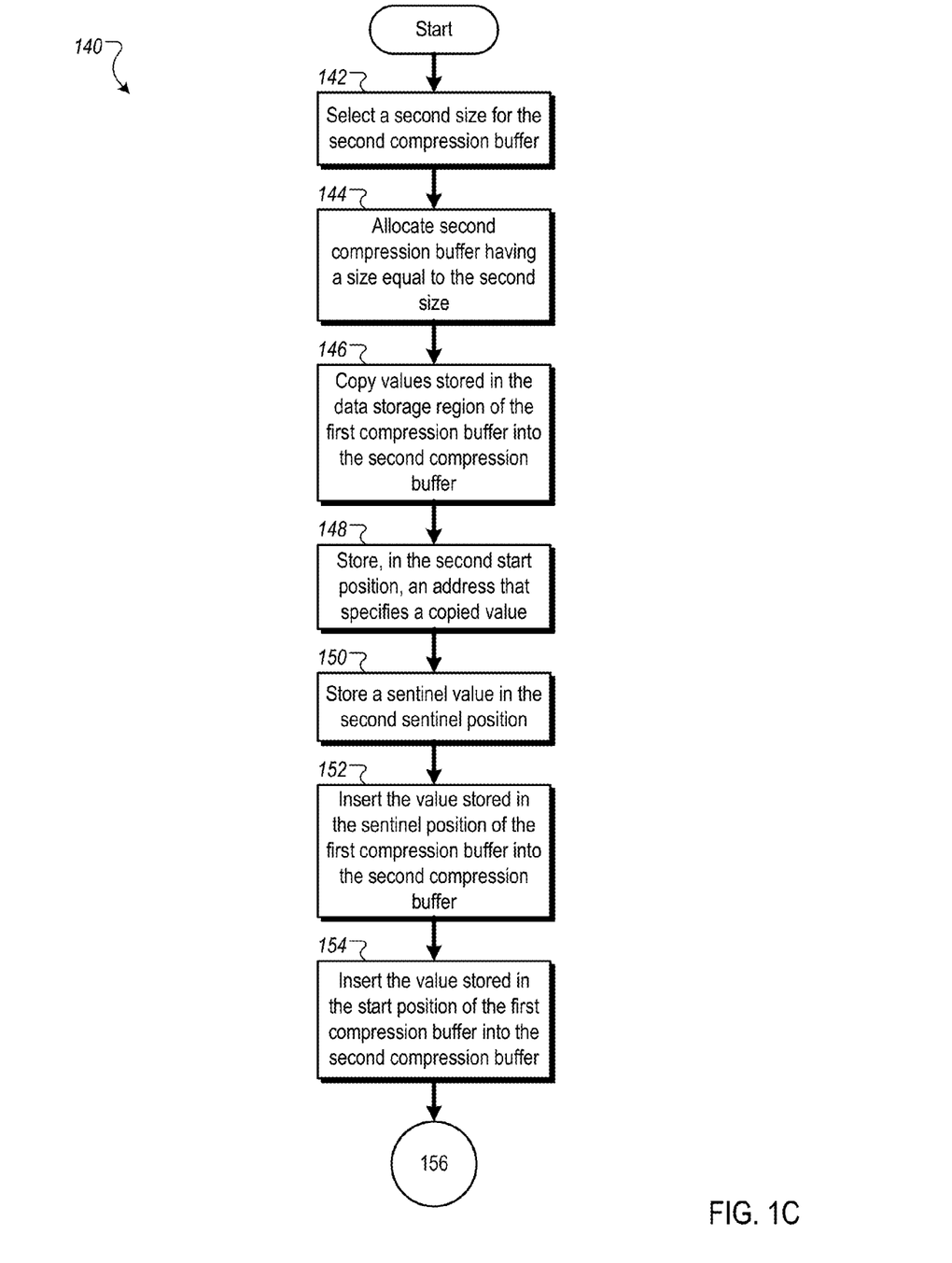
FIG. 1C is an example process flow in which a second compression buffer is allocated.

FIG. 1C is an example process flow 140 in which a second compression buffer is allocated. The process 140 may be implemented by a data processing apparatus, such as the data processing apparatus used to perform process 100.

The process 140 selects a second size for the second compression buffer (142). Any suitable size may be selected for the second compression buffer, provided that it is larger than the original compression buffer. In some implementations, the size selected is based on the size of the original compression buffer. For example, the size may be a multiple of the original compression buffer—e.g., if the original compression buffer is 1000 bytes, the size may be double the original—2000 bytes. In order to achieve amortized constant time for insertion of values, the size selected may be a multiple of the original buffer size.

The process 140 allocates a second compression buffer having a second start position, a second sentinel position, and a second data storage region (144). The size of the second compression buffer is the selected second size. In some implementations, the second compression buffer occupies a portion of the same memory space as the original compression buffer. For example, if the original compression buffer is 1000 bytes, some or all of the 1000 bytes of the original compression buffer may be re-used for the second compression buffer. In some implementations, the second compression buffer is allocated in a memory space separate from the space occupied by the original compression buffer.

The process 140 copies values stored in the data storage region of the first compression buffer into the second data storage region of the second compression buffer (146). For example, values may be copied into the second compression buffer in a manner that maintains their order. In other words, the values may be copied such that the end of the second compression buffer aligns with the end of the first compression buffer. As described above, in some implementations, the second compression buffer includes at least a portion of the first compression buffer when allocated. Accordingly, the process 150 may not need to copy some or any of the values that were stored in the original compression buffer—they will already be present in the second compression buffer.

In some implementations, any padding between the first sentinel value and the most recently compressed value stored in the first data storage region may be removed when the values are copied. In some implementations, the value most recently added to the data storage region of the first compression buffer—e.g., the value adjacent to the padding inserted in step 132—is not copied in step 146. This value may instead be prepended to the second data storage region of the compression buffer without the padding. The value may also be added using the process 114 described above with reference to FIG. 1B, without the need to generate or compress any previously copied values.

The process 140 stores, in the second start position, an address specifying the position of the last compressed value copied to the second compression buffer (148).

The process 140 stores a sentinel value in the second sentinel position (150). The sentinel value may be, for example, the same sentinel value described above—e.g., ~0 or 0xffffffff.

In some implementations, as described in further detail below, the process inserts the remaining values into the second compression buffer in a manner similar to that described above with reference to process 114. In some implementations, there is an exception—the last value copied from the data storage region of the first compression buffer is already compressed, so there is no need to perform steps 120 and 122 when inserting the value stored in the first sentinel position. In addition, given a second compression buffer size large enough, there may be no need to determine whether the second sentinel value is being encroached upon.

The process 140 inserts the value stored in the sentinel position of the first compression buffer into the second compression buffer (152). This may be performed, for example, in the manner described above with reference to steps 124-130. For example, the process 140 selects an offset position of the second compression buffer. The offset position is calculated based on the size of the value to be inserted—e.g., the size of the value stored in the sentinel position of the first compression buffer—and the address stored in the second start position.

The process 140 may store, in the second start position, the address of the offset position and store the value stored in the sentinel position of the first compression buffer in the offset position. At this point, the second data storage region of the second compression buffer includes the uncompressed value that was previously stored in the sentinel position of the first compression buffer and each compressed value that was stored in the first data storage region, without any padding.

The process 140 inserts the value stored in the start position of the first compression buffer into the second compression buffer (154). This may be performed, for example, in the manner described above with reference to steps 120-130. For example, the process 140 generates a compressed value from the value at the address specified by the second start position and the value stored in the first start position. As with the compression of values described above, the process generates the compressed value by calculating the difference between the value stored at the address specified by the second start position and the value stored in the first start position. For example, if the value stored at the address specified by the second start position was an integer, 10, and the value stored in the first start position was the integer 6, the compressed value would be 4 (e.g., 10−6=4).

The process 140 may then store the compressed value in the second data storage region of the second compression buffer. For example, the compressed value may be stored at the address specified by the second start position, e.g., adjacent to the most recently compressed value existing in the second data storage region of the second compression buffer.

The process 140 may select a second offset position of the second compression buffer, the second offset position being calculated based on the size of the next value to be inserted—e.g., the value stored in the first start position. The process 140 may then store, in the second start position, the address specified by the second offset position and copy the value stored in the first start position into the second offset position. At this point, the second data storage region of the second compression buffer stores each of the compressed values from the first compression buffer as well as a compressed version of the value that was stored in the first sentinel position of the first compression buffer and an uncompressed version of the value that was stored in the first start position of the first compression buffer.

The process 140 then proceeds to step 156, which is described above.

The process 140 described with reference to FIG. 1C is an example process for a allocating a second compression buffer. The order in which the steps are described with reference to FIG. 1C need not be the only manner in which a second compression buffer is allocated. Various steps may be performed in a different order or in a different manner. For example, the second sentinel value may be stored in the second sentinel position during allocation of the second compression buffer in step 144, or after step 154. In another example process, the padding from the first compression buffer may be removed or overwritten when the compressed value associated with the padding is stored in the second data storage region—e.g., prior to step 152.

Conceptual representation of a compression buffer.

Figure 2:
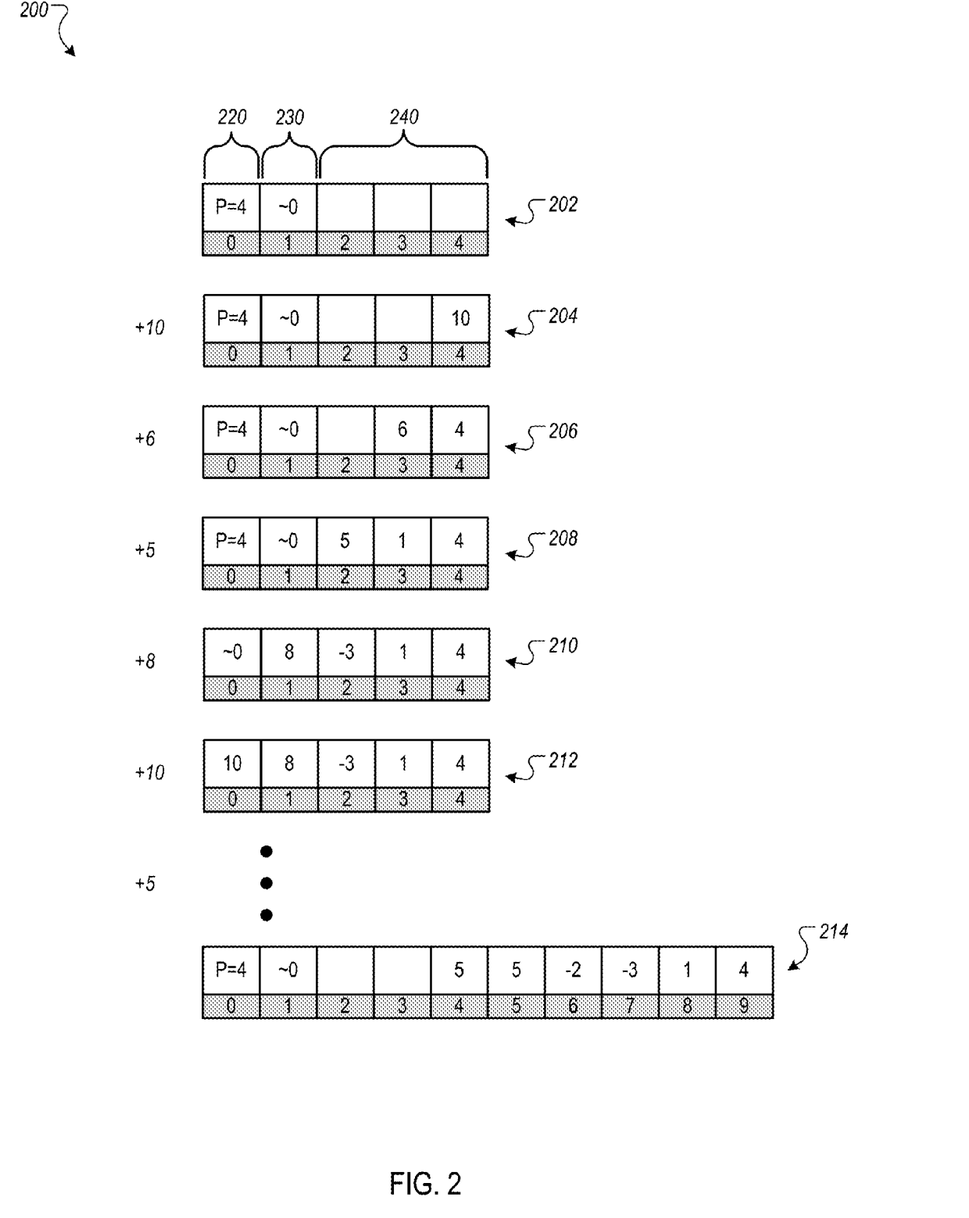
FIG. 2 depicts a conceptual representation of a compression buffer at various stages during encoding of delta values.

FIG. 2 depicts a conceptual representation 200 of an example compression buffer at various stages during encoding of delta values. The conceptual representation 200 is a conceptual view of, for example, a data storage area of a data processing apparatus, such as a tablet computer or mobile telephone.

At 202, a compression buffer is accessed, or allocated. The example compression buffer includes address values 0-4 for "blocks" of data. Three of the blocks comprise the data storage region 240 of the compression buffer—e.g., the blocks at address values 2, 3, and 4. The start position 220, e.g., the block at address 0, includes the address of the end of the compression buffer—4. The sentinel position 230 is adjacent to the start position, e.g., the block at address 1, and it includes a sentinel value.

At 204, a first value (e.g., 10) has been obtained and stored. The first value is stored in the block at address 4 because that is the block that was specified by the start position. The start position points to the beginning of the most recently added value, which is address 4. The first value is stored in uncompressed form because there is no pre-existing value for calculating a delta.

At 206, a second value (e.g., 6) has been obtained and stored. When the second value was entered, the first value was delta encoded by determining the difference between the first value and the second value and storing the difference, or delta value. Here, 10−6=4. Thus, the first value has been compressed and placed in the block at address 4. The second value is stored in uncompressed form in the next available space—e.g., the block at address 3. The value in the start position is updated to reflect the address of the second value.

At 208, a third value (e.g., 5) has been obtained and stored. When the third value was entered, the second value was delta encoded by determining the difference between the second value and the third value and storing the difference, or delta value. Here, 6−5=1. Thus, the second value has been compressed and placed in the block at address 3. The third value is stored in uncompressed form in the next available space—e.g., the block at address 2. The value in the start position is updated to reflect the address of the third value.

At 210, a fourth value (e.g., 8) has been obtained and stored. When the fourth value was entered, the third value was delta encoded by determining the difference between the third value and the fourth value and storing the difference, or delta value. Here, 5−8=−3. Thus, the third value has been compressed and placed in the block at address 2. Because the fourth value would encroach on the block that includes the sentinel value—block 1— the fourth value is stored in the sentinel position. If necessary, padding is inserted between the fourth value and the third value, e.g., between addresses 1 and 2. The value in the start position is replaced with a sentinel value to indicate that the compression buffer is nearly full.

At 212, a fifth value (e.g., 10) has been obtained and stored. The fifth value is placed in the start position because the sentinel value is no longer in the sentinel position. In this implementation, the fourth value remains uncompressed. Accordingly, at 212, the compression buffer includes the uncompressed fifth value in the start position, the uncompressed fourth value in the sentinel position, and the compressed third, second, and first values in the data storage region.

At 214, a sixth value (e.g., 5) has been obtained and stored. In addition, the compression buffer has doubled in size, allowing for entry of additional values. When the sixth value was obtained, new space was allocated for the compression buffer, and the existing values were copied into the new compression buffer. For example, the compressed first, second, and third values were copied into the blocks at, respectively, addresses 9, 8, and 7. In addition, the fourth value—which was previously stored in the sentinel position—has been compressed, e.g., 8−10 (the fifth value)=−2. Any padding between the fourth and fifth values has been removed, the fifth value—which was previously stored in the start position—has been compressed, e.g., 10−5 (the sixth value)=5. The sixth value is stored in the uncompressed form adjacent to the compressed fifth value. The new start position at address 0 points to the address (4) of the recently added sixth value, and a new sentinel value has been stored in the new sentinel position.

The example compression buffer described in FIG. 2 depicts a conceptual representation of compression buffer states that can be accomplished with any suitable data storage and addressing means. For example, an actual compression buffer may be stored in a computer-readable storage device, a computer-readable storage substrate, a random or serial access memory array or device, or a combination of one or more of them. In some implementations, compression buffers may be stored in one or more mass storage devices, such as a hard disk device, an optical disk device, a solid state disk device, a flash memory device, a storage device that is shared over a network by multiple computing devices, e.g., a cloud storage device, or some other large capacity storage device.

Example data processing apparatus.

Figure 3:
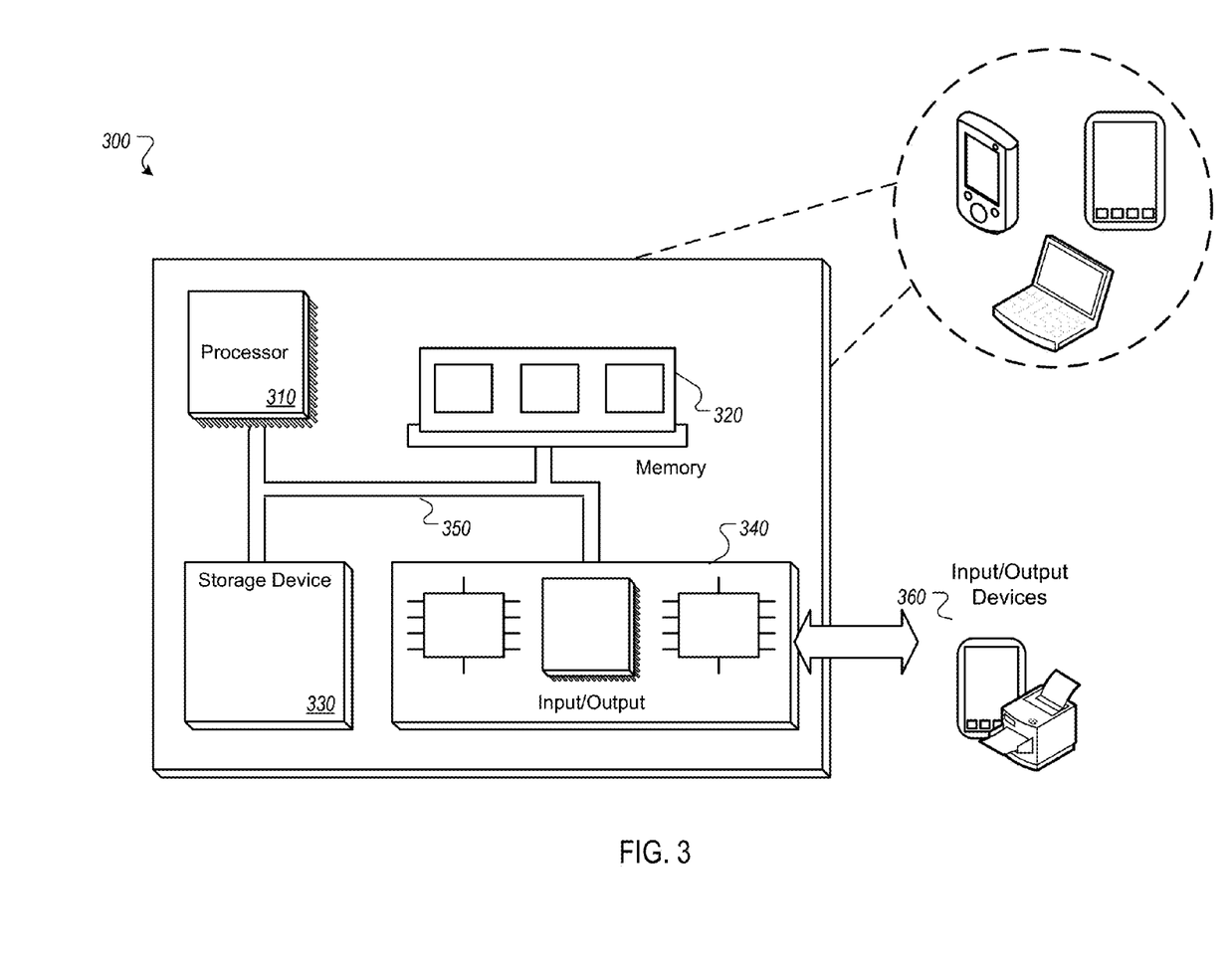
FIG. 3 is a block diagram of an example data processing apparatus.

FIG. 3 is a block diagram of an example data processing apparatus 300 that can be used to perform operations described above. The apparatus 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the apparatus 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the apparatus 300. In one implementation, the storage device 330 is a computer-readable medium. In various different implementations, the storage device 330 can include, for example, a hard disk device, an optical disk device, a storage device that is shared over a network by multiple computing devices, e.g., a cloud storage device, or some other large capacity storage device.

The input/output device 340 provides input/output operations for the apparatus 300. In one implementation, the input/output device 340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 360. Other implementations, however, can also be used, such as mobile computing devices, mobile communication devices, set-top box television client devices, etc.

Although an example data processing apparatus has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    accessing a first compression buffer that is full or almost full;
    allocating a second compression buffer that has a start position, a sentinel position, and a data storage region that is larger than the first compression buffer;
    copying each of multiple values stored in the first compression buffer into each of multiple contiguous positions of the second compression buffer in the data storage region;
    storing (i) an unsigned value to the sentinel position of the second compression buffer, and (ii) an address to the start position of the second compression buffer that corresponds to an outermost one of the multiple contiguous positions of the second compression buffer in the data storage region;

obtaining a first uncompressed value;

accessing a particular value stored in a position of the second compression buffer that corresponds to the address stored in the start position of the second compression buffer;

generating a first compressed value by subtracting the first uncompressed value from the particular value; and storing (i) the first compressed value in the position of the second compression buffer that corresponds to the address stored in the start position of the second compression buffer in place of the particular value, and (ii) the first uncompressed value in a position of the second compression buffer adjacent to that which corresponds to the address stored in the start position of the second compression buffer in place of the particular value.

2. The method of claim 1, wherein an order of the values in the first compression buffer is maintained when the values are copied into the second compression buffer.

3. The method of claim 1, further comprising:
before allocating a second compression buffer, determining that the first compression buffer is full or almost full; and
wherein the second compression buffer is allocated in response to determining that the first compression buffer is full or almost full.

4. The method of claim 3, wherein determining that the first compression buffer is full or almost full comprises:
determining that neither (i) a value stored in a sentinel position of the first compression buffer, nor (ii) a value stored in a start position of the first compression buffer, are unsigned values.

5. The method of claim 3, wherein accessing the first compression buffer comprises:
accessing a first compression buffer that has a start position, a sentinel position, and a data storage region.

6. The method of claim 5, wherein copying each of the multiple values stored in the first compression buffer into each of multiple contiguous positions of the second compression buffer in the data storage region comprises:
copying values stored in (i) the start position of the first compression buffer and (ii) the data storage region of the first compression buffer, into the data storage region of the second compression buffer.

7. The method of claim 6, wherein the particular value stored in the position of the second compression buffer that corresponds to the address stored in the start position of the second compression buffer is a copy of that having been stored in the start position of the first compression buffer.

8. The method of claim 1, further comprising:
storing, in place of the address stored in the start position of the second compression buffer, an address that corresponds to the position of the second compression buffer in which the first uncompressed value is stored.

9. A method performed by a data processing apparatus, the method comprising:
accessing a compression buffer having a start position, a sentinel position, and a data storage region;
obtaining a first uncompressed value;
determining that an unsigned value is stored in the sentinel position of the compression buffer;
determining that an address stored in the start position of the compression buffer corresponds to a first position of the compression buffer that is not located at the end of the data storage region of the compression buffer;

in response to determining that the unsigned value is stored in the sentinel position of the compression buffer and determining that the address stored in the start position of the compression buffer corresponds to the first position of the compression buffer:
generating a first compressed value by subtracting (i) the first uncompressed value from (ii) a particular value stored in the first position of the compression buffer that corresponds to the address stored in the start position of the compression buffer;
selecting a second position of the compression buffer by subtracting (i) a size of the first uncompressed value from (ii) the first position of the compression buffer that corresponds to the address stored in the start position of the compression buffer; and
storing (i) the first compressed value in place of the particular value in the first position of the compression buffer that corresponds to the address stored in the start position of the compression buffer, and (ii) the first uncompressed value in the second position of the compression buffer.

10. The method of claim 9, further comprising:
storing, in place of the address stored in the start position of the compression buffer, an address that corresponds to the second position of the compression buffer.

11. The method of claim 9, further comprising:
before storing the first compressed value and the first uncompressed value, determining that the second position of the compression buffer is the sentinel position of the compression buffer;
in response to determining that that the second position of the compression buffer is the sentinel position of the compression buffer, inserting padding between the end of the sentinel position and the first position of the compression buffer that corresponds to the address stored in the start position of the compression buffer; and
wherein storing the first compressed value and the first uncompressed value comprises storing (i) the first compressed value in place of the particular value in the first position of the compression buffer that corresponds to the address stored in the start position of the compression buffer, and (ii) the first uncompressed value in place of an unsigned value in the sentinel position of the compression buffer.

12. The method of claim 11, further comprising:
storing an unsigned value in place of the address stored in the start position of the compression buffer.

13. A system comprising:
a data processing apparatus; and
a data store storing instructions that, when executed by the data processing apparatus, cause the data processing apparatus to perform operations comprising:
accessing a first compression buffer that is full or almost full;
allocating a second compression buffer that has a start position, a sentinel position, and a data storage region that is larger than the first compression buffer;
copying each of multiple values stored in the first compression buffer into each of multiple contiguous positions of the second compression buffer in the data storage region;
storing (i) an unsigned value to the sentinel position of the second compression buffer, and (ii) an address to the start position of the second compression buffer that corresponds to an outermost one of the multiple contiguous positions of the second compression buffer in the data storage region;

obtaining a first uncompressed value;

accessing a particular value stored in a position of the second compression buffer that corresponds to the address stored in the start position of the second compression buffer;

generating a first compressed value by subtracting the first uncompressed value from the particular value; and storing (i) the first compressed value in the position of the second compression buffer that corresponds to the address stored in the start position of the second compression buffer in place of the particular value, and (ii) the first uncompressed value in a position of the second compression buffer adjacent to that which corresponds to the address stored in the start position of the second compression buffer in place of the particular value.

* * * * *